United States Patent [19]

Kita et al.

[11] Patent Number: 5,172,245
[45] Date of Patent: Dec. 15, 1992

[54] ELECTRONIC INFORMATION RETRIEVAL APPARATUS FOR IMAGE INFORMATION USING PRIMARY AND SECONDARY MENUS

[75] Inventors: Sumio Kita; Sakuharu Takano, both of Nara; Yuji Katsuta, Yamatokooriyama, all of Japan

[73] Assignee: Sharp Kabushiki Kaisha, Osaka, Japan

[21] Appl. No.: 483,986

[22] Filed: Feb. 21, 1990

Related U.S. Application Data

[63] Continuation of Ser. No. 109,279, Oct. 16, 1987, abandoned.

[30] Foreign Application Priority Data

Oct. 17, 1986 [JP] Japan ................ 61-247867
Oct. 17, 1986 [JP] Japan ................ 61-247869
Oct. 17, 1986 [JP] Japan ................ 61-247870

[51] Int. Cl.$^5$ ............................................. G06F 15/62
[52] U.S. Cl. .................................. 358/403; 382/61; 395/118; 395/156; 364/DIG. 2; 364/948.21; 364/963.4; 364/963
[58] Field of Search ... 364/200 MS File, 900 MS File; 358/403, 433; 382/56, 61; 395/100, 118, 156

[56] References Cited

U.S. PATENT DOCUMENTS

| | | | |
|---|---|---|---|
| 4,168,489 | 9/1979 | Ervin | 340/146.3 AH |
| 4,408,181 | 10/1983 | Nakayama | 382/61 |
| 4,410,958 | 10/1983 | Demke et al. | 364/900 |
| 4,418,345 | 11/1983 | Demke et al. | 340/731 |
| 4,445,195 | 4/1984 | Yamamoto | 364/900 |
| 4,468,755 | 8/1984 | Iida | 364/900 |
| 4,486,870 | 12/1984 | Pettigrew et al. | 364/518 X |
| 4,555,803 | 11/1985 | Hirose | 382/61 |
| 4,574,395 | 3/1986 | Kato | 382/56 |
| 4,587,633 | 5/1986 | Wang et al. | 364/900 |
| 4,602,333 | 7/1986 | Komori | 382/56 X |
| 4,607,290 | 8/1986 | Murakami | 358/260 |
| 4,647,911 | 3/1987 | Maegawa et al. | 340/365 R |
| 4,742,558 | 5/1988 | Ishibashi et al. | 382/56 |
| 4,748,511 | 5/1988 | Nichols et al. | 358/256 |
| 4,748,678 | 5/1988 | Takeda et al. | 385/56 |
| 4,764,975 | 8/1988 | Inoue | 382/56 X |
| 4,817,050 | 3/1989 | Komatsu et al. | 382/65 |
| 4,829,453 | 5/1989 | Katsuta et al. | 364/521 |

FOREIGN PATENT DOCUMENTS

60134357 12/1983 Japan .
60196856 3/1984 Japan .

OTHER PUBLICATIONS

"Design of Man-Computer Dialogues", James Martin, 1973, pp. 111-118.

*Primary Examiner*—Thomas C. Lee
*Assistant Examiner*—Richard Lee Ellis

[57] ABSTRACT

Disclosed is an electronic information retrieval apparatus in the apparatus when a retrieval instruction is supplied to the electronic information retrieval apparatus, broad sort names are read from storage (8) and are displayed on a CRT display. Within the displayed sort names, a desired one is designated by a keyboard (1), so that detailed sort names corresponding to the designated sort name are read from the storage (8) and are displayed on the CRT display (2). When an object detailed sort name is displayed and selected by the keyboard (1), corresponding picture information is displayed on the CRT display (2). This allows the user to efficiently retrieve stored information.

8 Claims, 15 Drawing Sheets

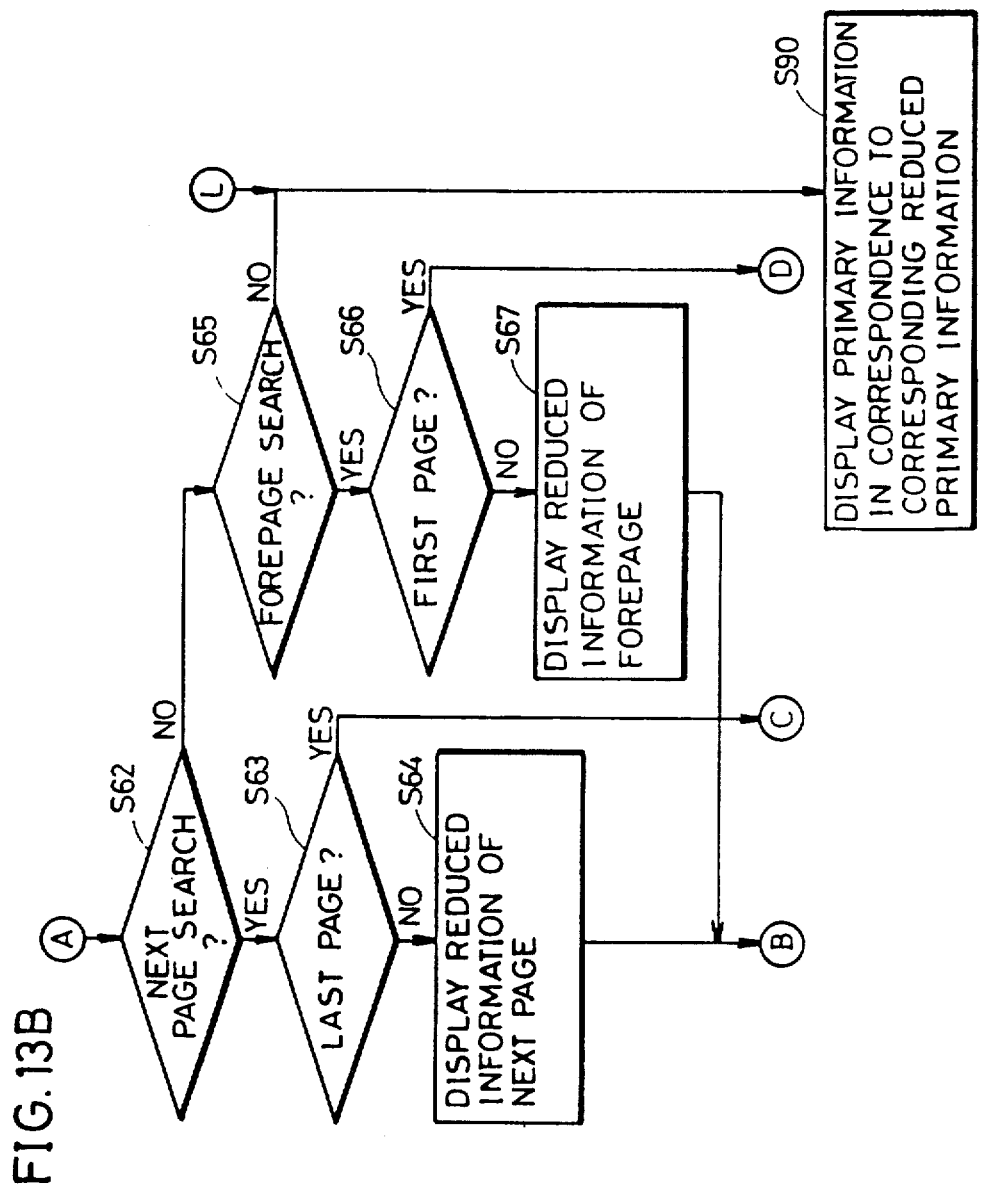

SYSTEM FOR STORAGE AND RETRIEVAL OF LOW AND HIGH RESOLUTION VERSIONS OF DOCUMENT IMAGES USING HIERARCHAL CATEGORY AND SUB-CATEGORY MENUS

This application is a continuation, of application Ser. No. 07/109,279 filed on Oct. 16, 1987, now abandoned.

BACKGROUND OF THE INVENTION

1. Field of the Invention

The present invention relates to an electronic information retrieval apparatus. More specifically, it relates to an electronic information retrieval apparatus which registers originals such as documents and drawings in memory in the form of picture information, to read and retrieve required picture information.

2. Description of the Prior Art

Various information retrieval methods have been proposed in the art in order to control great volumes of documents and drawings.

FIGS. 1 and 2 are illustrative of typical conventional information retrieval methods. Particularly FIG. 1 shows an example of a cabinet type information retrieval method, and FIG. 2 shows an example of a keyword type information retrieval method.

In the cabinet type information retrieval method as shown in FIG. 1, data 21 formed by a plurality of pages are inserted in files 23 with data names 24. The plurality of files 23 assigned with the data names 24 are partitioned by guides 25 every common items, to be contained in a cabinet 26.

In retrieval operation, a guide 25 for a required item is retrieved to extract the required file from the plurality of files 23, thereby to fetch required data 21 from the file 23.

In the keyword type information retrieval method as shown in FIG. 2, data 21 formed by a plurality of pages are inserted in files 23. Labels 27 assigned with keywords for specifying the respective pages of the data 21 are attached to the files 23, which are contained in a cabinet 26.

In order to fetch required data 21 in the keyword type information retrieval method, a file 23 for a required item is extracted through observation of the labels 27 which are attached to the files 23 contained in the cabinet 26. Data 21 indicated by a required keyword is retrieved from the file 23.

In the cabinet type information retrieval method, however, required data must be retrieved from prescribed items while making reference to a list of correspondence between guides and data names in troublesome operations. In the keyword type information retrieval method, on the other hand, it has been extremely difficult to systemize keywords so that only object data can be selected.

SUMMARY OF THE INVENTION

Accordingly, a principal object of the present invention is to provide an electronic information retrieval apparatus which enables retrieval of a natural flow for performing retrieval from a broad concept to a narrow concept.

Briefly stated, the present invention provides an electronic information retrieval apparatus in which picture information is read from an original by a picture information reading device to store the same in a storage device, while retrieval information corresponding to the read picture information is inputted from a retrieval information input device to be stored in the storage device. It sequentially reads the plurality of pieces of retrieval information to display the same on a display device means, to read, in response to a selection of a piece of the displayed retrieval information by retrieval instruction circuitry, picture information corresponding to the piece of retrieval information from the storage device thereby to display the same on the display device.

According to the present invention, therefore, desired picture information can be displayed by simply retrieving the retrieval information appearing on the display device. Thus, object picture information can be readily retrieved without making a list of correspondence between a keyword system or data names and guide numbers.

In a preferred embodiment of the present invention, read picture information is reduced for storage, to thereby increase storage capacity of the storage device.

In a further preferred embodiment of the present invention, pieces of information forming covers of respective pieces of picture information are sequentially displayed to retrieve cover information of required picture information, thereby to retrieve required corresponding picture information upon retrieval of the required cover information.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
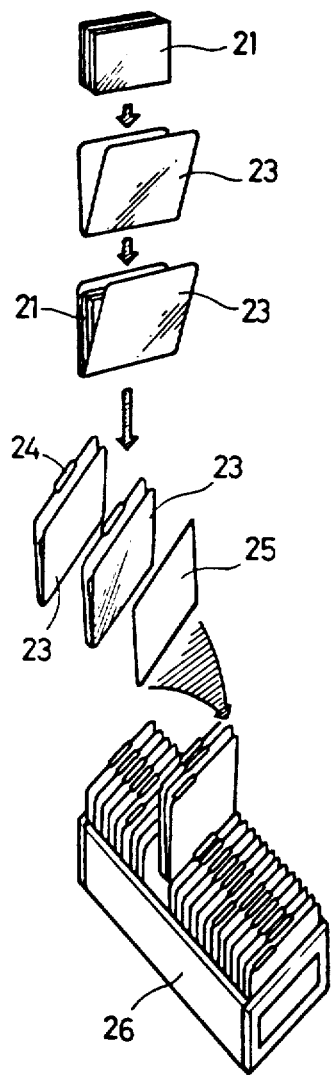
FIG. 1 is a diagram for illustrating the concept of a conventional cabinet type information retrieval method.
Figure 2:
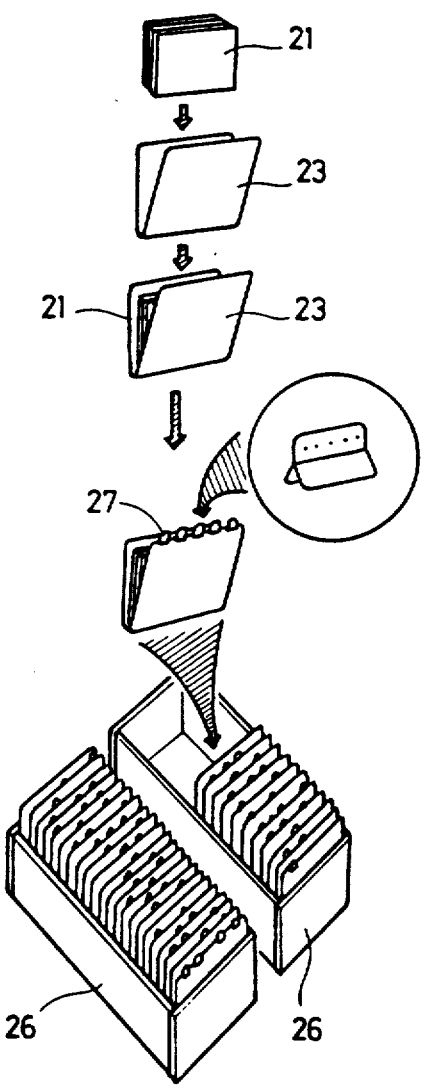
FIG. 2 is a diagram for illustrating the concept of a conventional keyword type information retrieval method.
Figure 3:
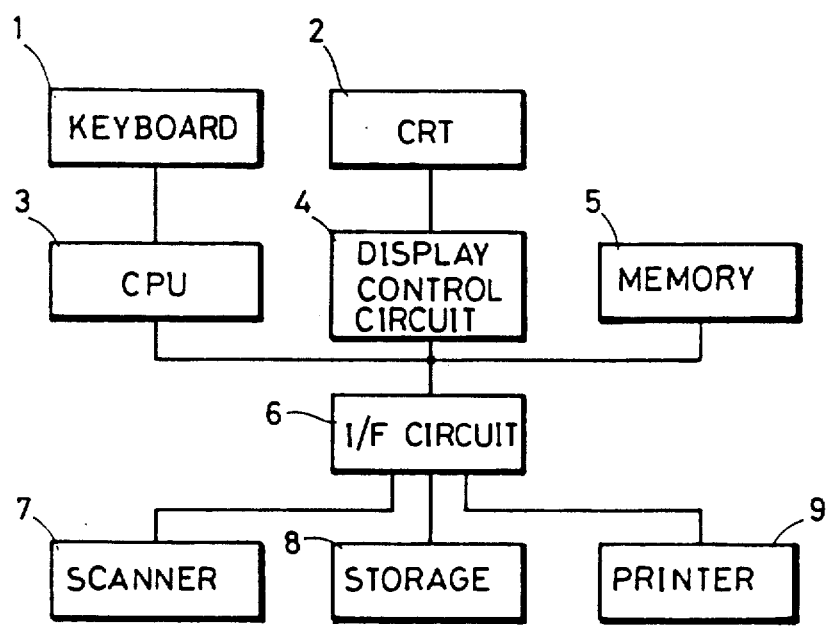
FIG. 3 is a schematic block diagram showing a concept of the present invention.

FIG. 3 is a schematic block diagram showing a concept of the present invention.

Referring to FIG. 3, description is now made on the structure of this concept. A keyboard 1, which is adapted to input various instructions and data etc., is connected to a CPU 3. The CPU 3 is further connected with a display control circuit 4, memory 5 and an interface circuit 6. The display control circuit 4 is connected with a CRT display 2, to display picture information serving as primary information, retrieval information serving as secondary information etc. on the CRT display 2. The CRT display 2 can display information in resolution of 1780 dots by 1256 dots, for example, and displays picture information of A4 size in resolution of 6/mm by 6/mm.

The memory 5 is adapted to temporarily store picture information read out from storage 8 as hereinafter described. The interface circuit 6 is connected with a scanner 7, the storage 8 and a printer 9. The scanner 7 is adapted to read picture information from an original formed by a plurality of pages in resolution of 12/mm by 12/mm, for example. The storage 8 is formed by a photoelectro-magnetic disk unit, for example, to store picture information, retrieval information etc. The printer 9 is adapted to print the picture information etc.

Figure 4:
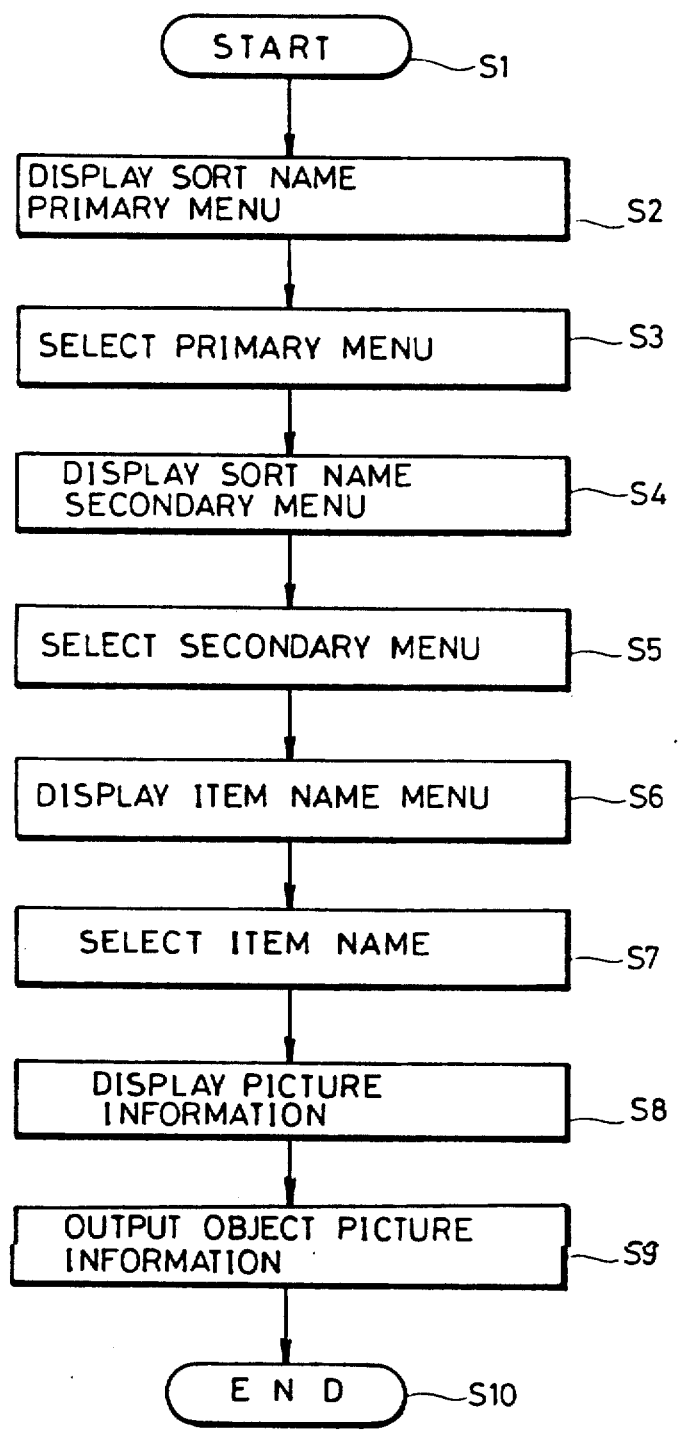
FIG. 4 is a flow chart for illustrating the operation of the concept as shown in FIG. 3.
Figure 5:
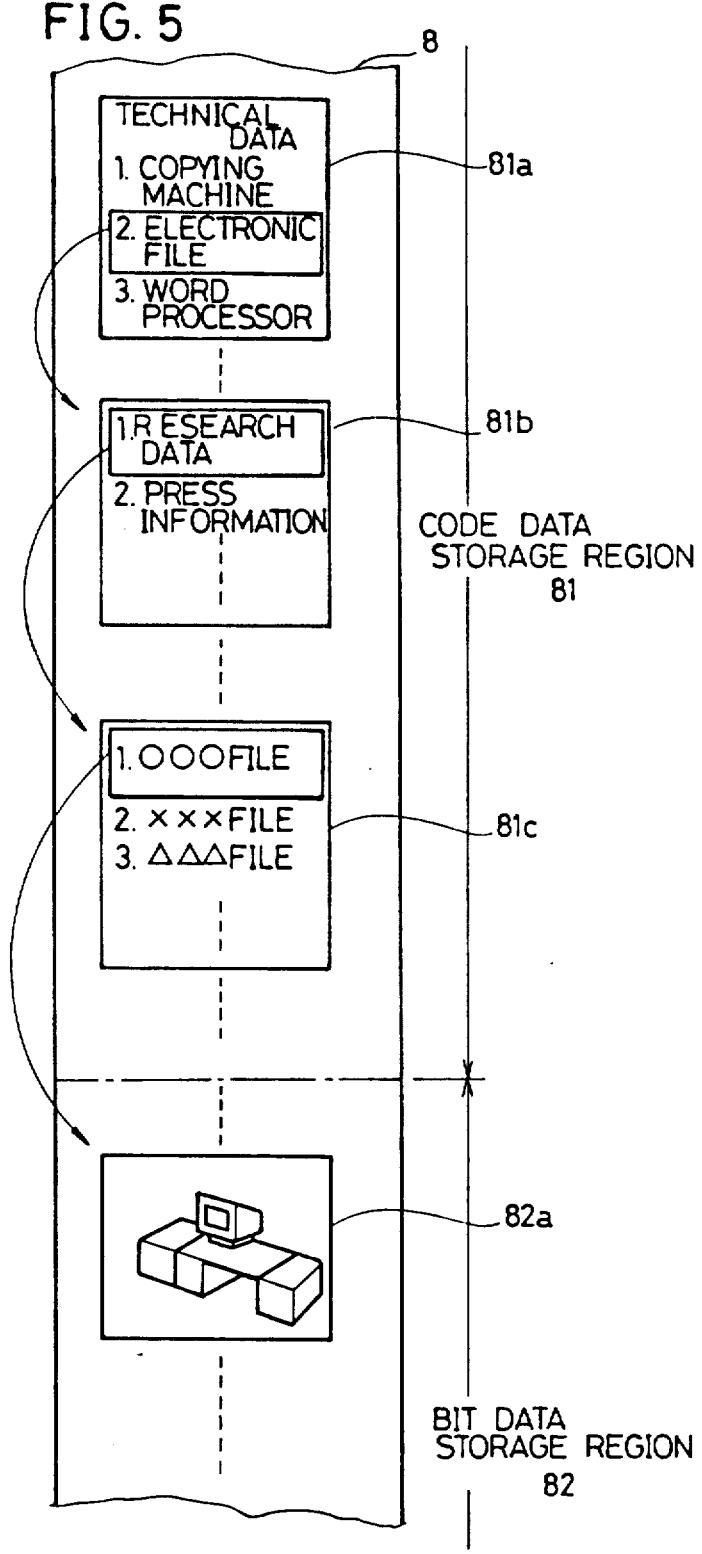
FIG. 5 is a diagram for illustrating picture information and retrieval information stored in storage as shown in FIG. 3.
Figure 6:
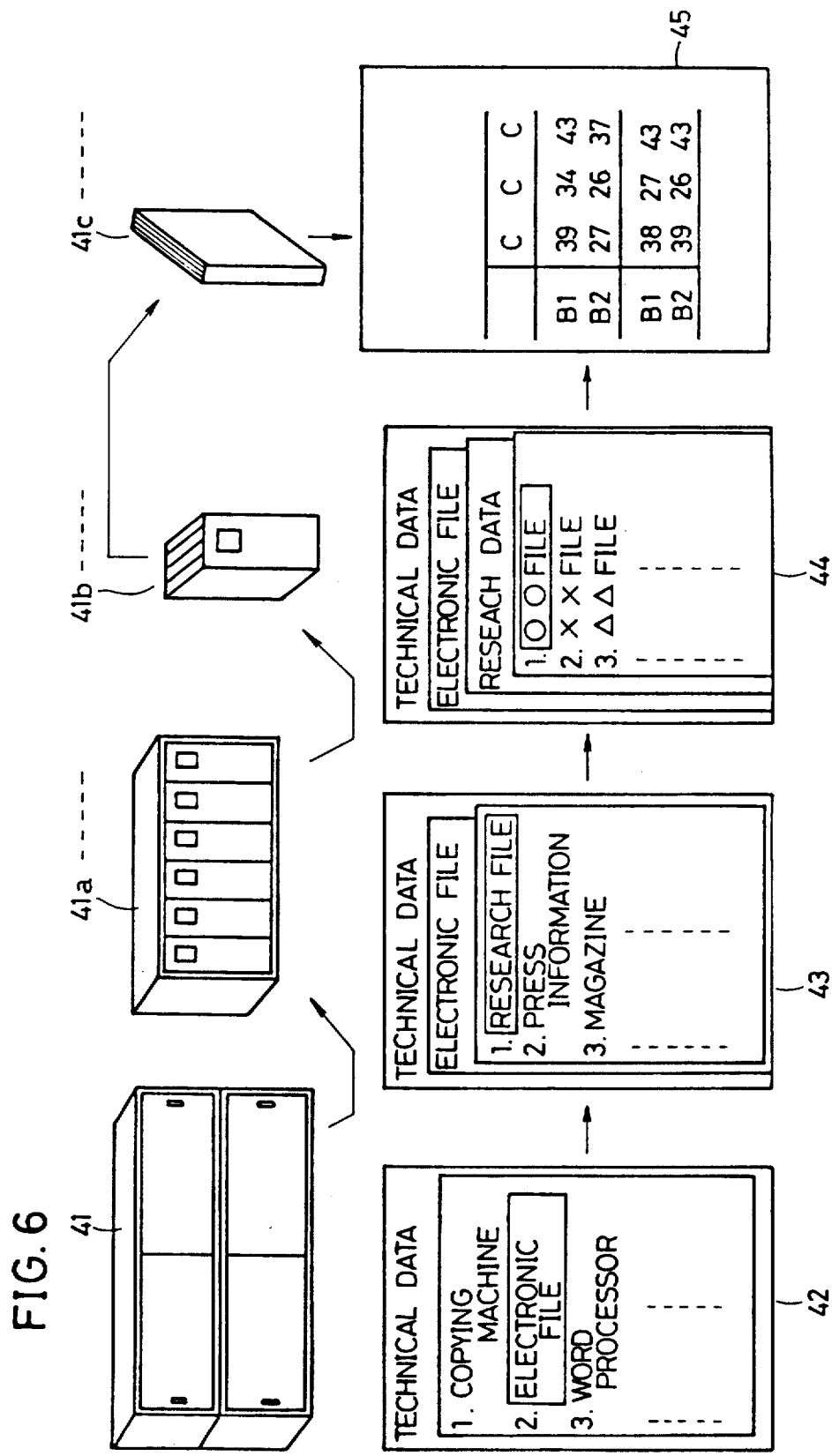
FIG. 6 is a diagram for illustrating the concept of retrieval according to the present invention.

FIG. 4 is a flow chart for illustrating the operation of the concept of the present invention and FIG. 5 is a diagram for illustrating picture information and retrieval information stored in the storage as shown in FIG. 3, while FIG. 6 is a diagram for illustrating the concept of retrieval according to the present invention.

As shown in FIG. 5, the storage 8 is formed by a code data storage region 81 and a bit data storage region 82. The bit data storage region 82 stores primary information 82a, 82a, ... such as picture information. The code data storage region 81 is adapted to store secondary information, which is retrieval information for retrieving the primary information, and is formed by areas 81a, 81a, ... for storing broad sort names such as a primary menu, areas 81b, 81b, ... for storing detailed sort names such as a secondary menu and areas 81c, 81c, ... for storing retrieval items, etc.

With reference to FIGS. 3 to 6, a description is now made given on the embodiment of the present invention.

Information required for retrieval as stored in the storage 8 is previously transferred to the memory 5, to perform retrieval for the contents of the memory 5. On the basis of a retrieval start instruction at a step S1, the CPU 3 reads out the broad sort names from the storage area 81a of the storage 8 as the primary menu, to transfer the same to the memory 5 through the interface circuit 6. Then the CPU 3 makes the display control circuit 4 display the primary menu transferred to the memory 5 on the CRT display 2. At a step S3, an operator searches an object sort name from the primary menu appearing on the CRT display 2, to input the sort name through the keyboard 1 or tablet means (not shown). In the example as shown in FIG. 5, the operator selects the item "2. ELECTRONIC FILE".

In response to selection of the primary menu, the CPU 3 reads out detailed sort names corresponding to the selected broad sort name from the storage area 81b of the storage 8 through the display of the primary menu, to transfer the same to the memory 5. Then the CPU 3 makes the display control circuit 4 display the detailed sort names on the CRT display 2 as a secondary menu. At a step S5, the operator selects an object detailed sort name through the keyboard 1 similarly to the case of menu display of the broad sort names. In the example as shown in FIG. 5, the operator selects the item "1. RESEARCH DATA" from the secondary menu.

Then, at a step S6, the CPU 3 reads out an item name menu belonging to the detailed sort name selected from the secondary menu from the storage area 81c of the storage 8 to transfer the same to the memory 5, and makes the display control circuit 4 display the item name menu on the CRT display 2. At a step S7, the operator selects an object item name such as "1.00 FILE" from the item name menu appearing on the CRT display 2. The CPU 3 determines that the object item name is selected, to read picture information serving as primary information corresponding to the selected item name from the storage area 82a of the storage 8 at a step S8, thereby to transfer the same to the memory 5. Then the CPU 3 makes the display control circuit 4 display the picture information on the CRT display 2.

The operator confirms the displayed picture information to issue an output instruction through the keyboard 1, so that the CPU 3 makes the picture information printed by the printer 9 at a step S9, to terminate the retrieval operation at a step S10.

According to the embodiment as hereinabove described, retrieval can be performed in a similar manner to information retrieval in a file cabinet as shown in FIG. 6. In the case of file cabinet retrieval, an object file rack 41a is selected from a file cabinet 41 to extract an object file 41b from the file rack 41a. Then an object item file 41c is extracted from the file 41b, so that object picture information 45 is finally retrieved from the object item file 41c.

In the aforementioned embodiment of the present invention, a sort name is specified through a broad sort menu display 42 and a detailed sort name menu 44 included in the sort name, similarly to the flow as shown in FIG. 6.

Although the sort names are classified into two stages in the aforementioned embodiment, such sort names may be retrieved in arbitrary stages depending on the content of retrieval.

Figure 7:
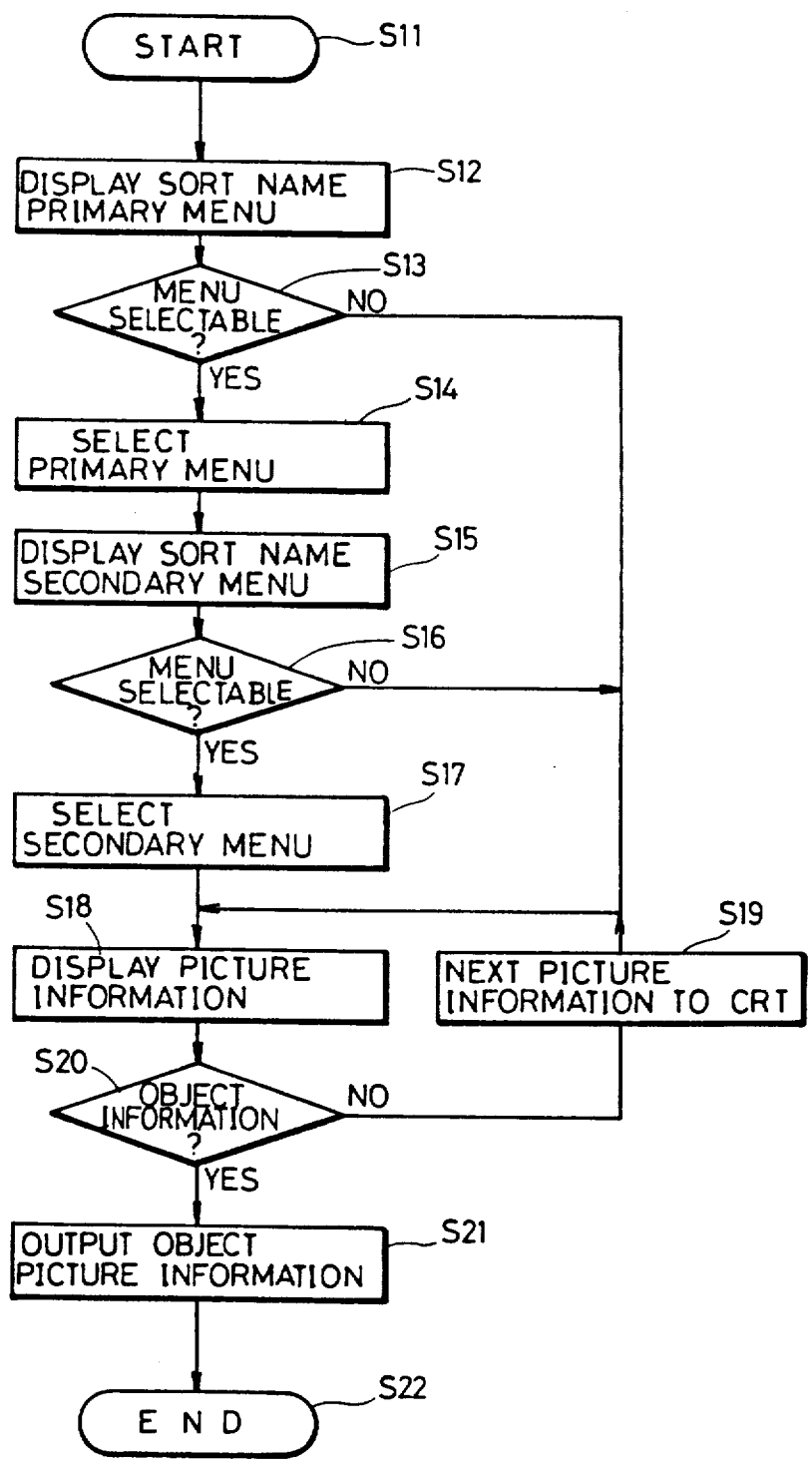
FIG. 7 is a flow chart for illustrating the operation of another concept of the present invention.
Figure 8:
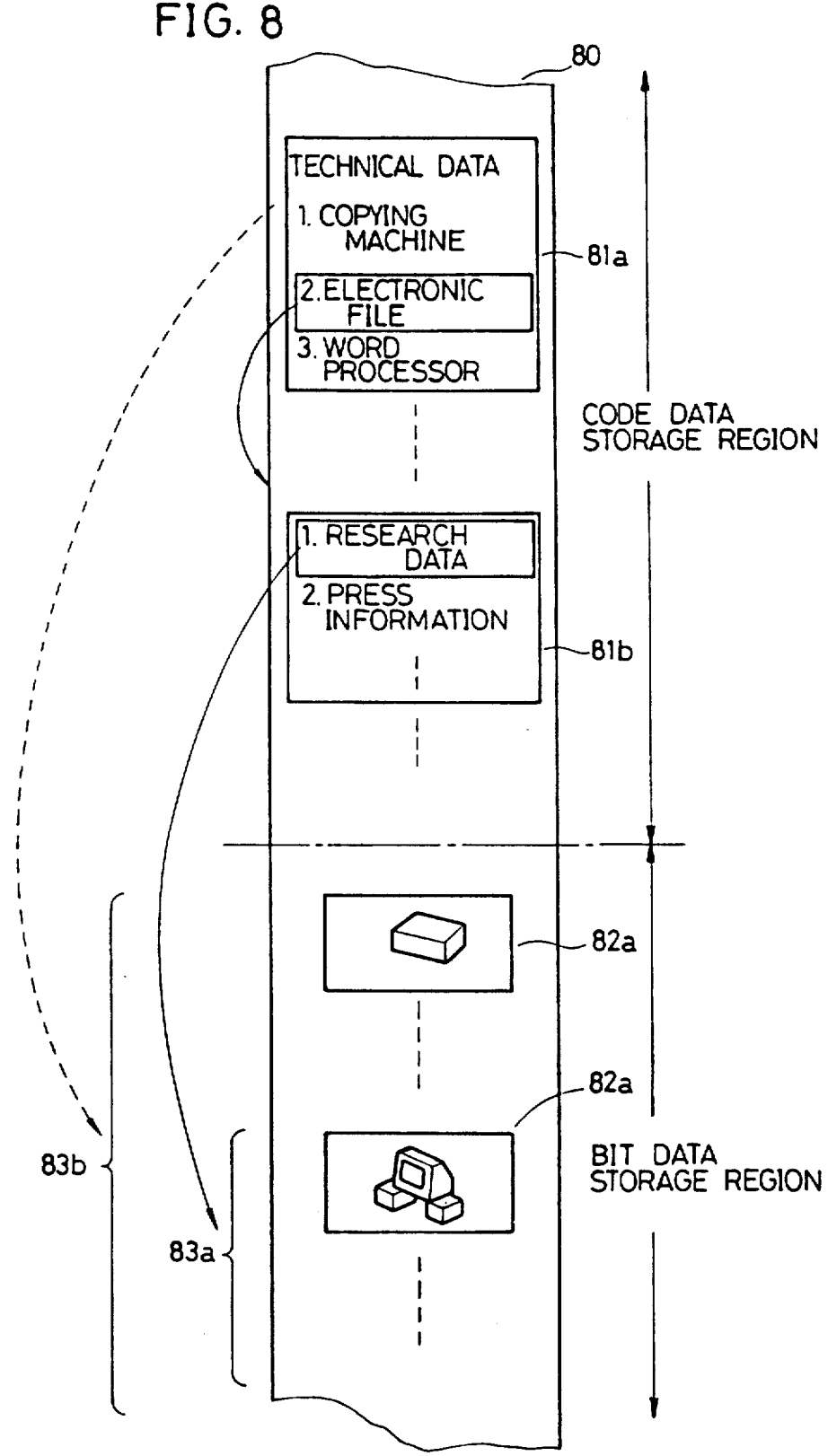
FIG. 8 is illustrative of information stored in storage in the concept as shown in FIG. 7.
Figure 9:
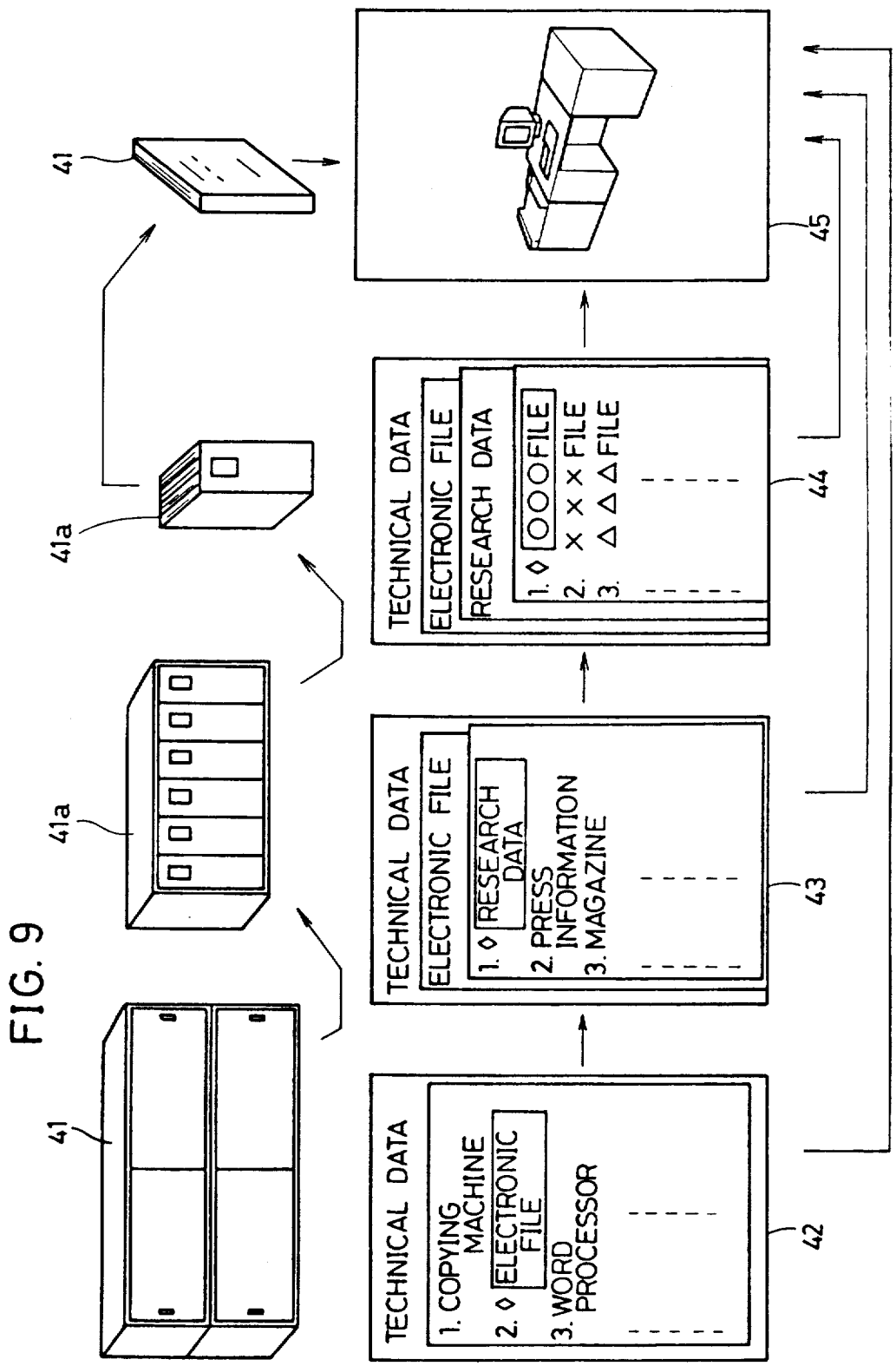
FIG. 9 is a diagram for illustrating the concept of retrieval as shown in FIG. 7.

FIG. 7 is a flow chart for illustrating the operation of another concept of the present invention and FIG. 8 is illustrative of information stored in storage in this embodiment, while FIG. 9 is a diagram for illustrating the concept of retrieval in this invention.

The retrieval apparatus of this embodiment is structured similarly to that shown in the block diagram of FIG. 3. Storage 8 has a code data storage region 81 and a bit data storage region 82 as shown in FIG. 8. Within the code data storage region 81, a storage area 81a stores broad sort names as a primary menu, and a storage area 81b stores detailed sort names as a secondary menu. An area 82a of the bit data storage region 82 stores picture information belonging to detailed sorting.

Referring to FIG. 7, description is now made on the operation of this embodiment. On the basis of a retrieval start instruction at a step S11, a CPU 3 reads out the broad sort names from the code data storage region 81 of the storage 8 to transfer the same to memory 5. At a step S12, the CPU 3 displays the broad sort names transferred to the memory 5 on a CRT display 2. The operator recognizes the broad sort names displayed on the CRT display 2 at a step S13 to judge whether or not the displayed sort names include required picture information. If a selectable sort name is included, the operator selects the sort name through a keyboard 1 or tablet means (not shown) at a step S14.

In response to the operation of the keyboard 1, the CPU 3 reads out the second menu formed by detailed sort names relating to the selected broad sort name from the storage area 81b of the storage 8, to transfer the same to the memory 5. At a step S15, the CPU 3 makes a display control circuit 4 display the detailed sort names transferred to the memory 5 on the CRT display 2. Similarly to the case of the broad sort name display, the operator judges whether or not the displayed detailed sort names include required information at a step S16. If the judgement is of YES, the operator selects an object sort name at a step S17. At a step S18, the CPU sequentially displays pieces of picture information on the CRT display 2 within the range thus restricted. At a step S20, the operator judges whether or not the displayed information is desired picture information, and if the desired picture information is displayed on the CRT display 2, the operator issues an output instruction from the keyboard 1 at a step S21, to make the desired information printed by a printer 9, thereby to terminate the retrieval operation at a step S22.

If the operator judges that the information appearing on the CRT display 2 is not the desired one, he inputs a message of unselectableness from the keyboard 1 etc. Upon the instruction of unselectableness from the keyboard 1 etc., the CPU 3 makes the display control circuit 4 display picture information within a range 83b or 83a theretofore restricted on the CRT display 2. At a step S20, the operator judges whether or not the displayed information is the desired picture information, to make next picture information displayed at a step S19 if the judgement is of NO. The CPU 3 repeats the operation of the steps S18 to S20 until the desired picture information is displayed, to perform the operation of the steps S21 and S22 upon display of the desired picture information.

As hereinabove described, retrieval can also be performed in this embodiment in a similar manner to the information retrieval in a file cabinet, similarly to the first embodiment. In the case of the file cabinet retrieval, an object file rack 41a is selected from a file cabinet 41 to extract an object file 41b from the file rack 41a, so that an object item file 41c is extracted from the file 41b to finally retrieve object picture information 45 from the object item file 41c, as shown in FIG. 9. When the file of the object picture information cannot be restricted, the files are successively manually turned to retrieve the desired picture information.

Similarly to the above, a menu 43 including desired picture information is selected from a broad sorting menu 42 in the second embodiment of the present invention to narrow a range 44 of picture information, so that desired picture information 45 can be retrieved by sequentially displaying pieces of picture information within a finally restricted range.

Figure 10:
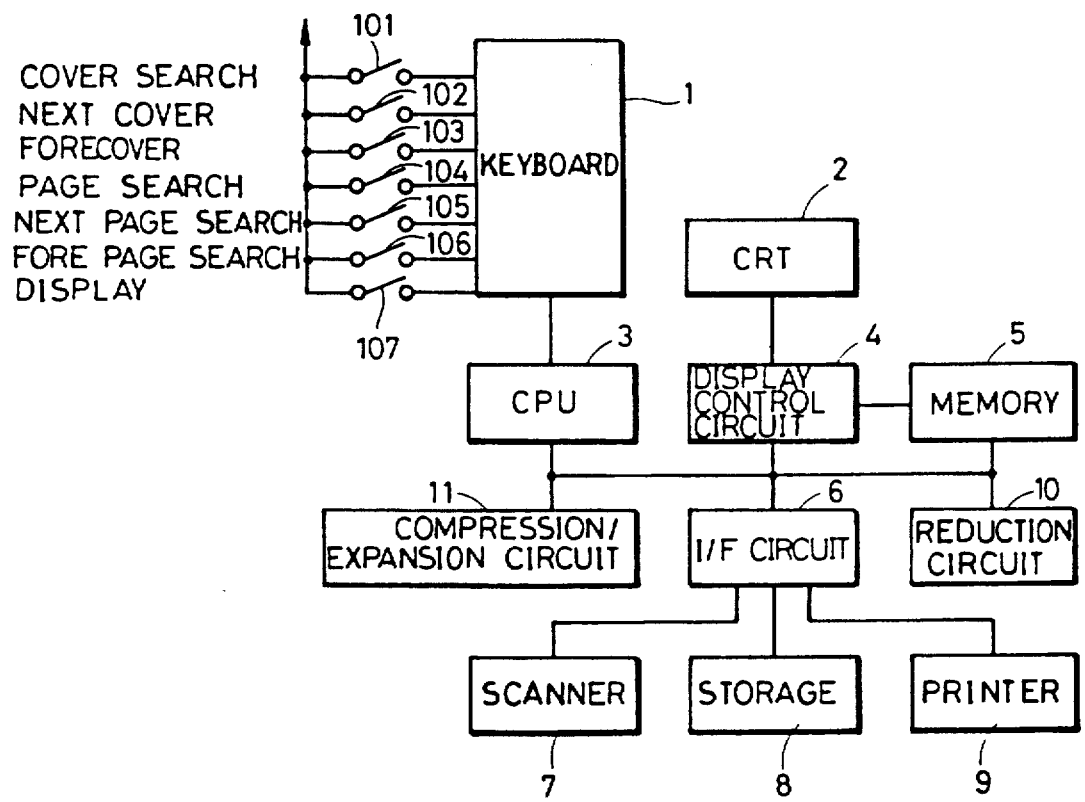
FIG. 10 is a schematic block diagram showing an embodiment of the present invention.

FIG. 10 is a schematic block diagram showing an embodiment of the present invention.

In the embodiment as shown in FIG. 10, a reduction circuit 10 and a compression/expansion circuit 11 are further connected to the CPU 3 as shown in the block diagram of FIG. 3. A keyboard 1 includes a cover search key 101, a next cover search key 102, a forecover search key 103, a page search key 104, a next page search key 105, a forepage search key 106 and a display key 107.

The reduction circuit 10 is adapted to produce reduced primary information by thinning picture information serving as primary information read by a scanner 7. The reduction circuit 10 is prepared by a dedicated IC such as MN8617 by Matsushita, for example. The compression/expansion circuit 11 is adapted to compress the picture information serving as the primary information and the reduced primary information by prescribed technique and to expand the compressed information. The compression/expansion circuit 11 is prepared by a dedicated IC such as HD63085 by Hitachi, for example. Compression by the compression/expansion circuit 11 is performed by coding binarized picture information by modified Huffman codes, for example.

Figure 11:
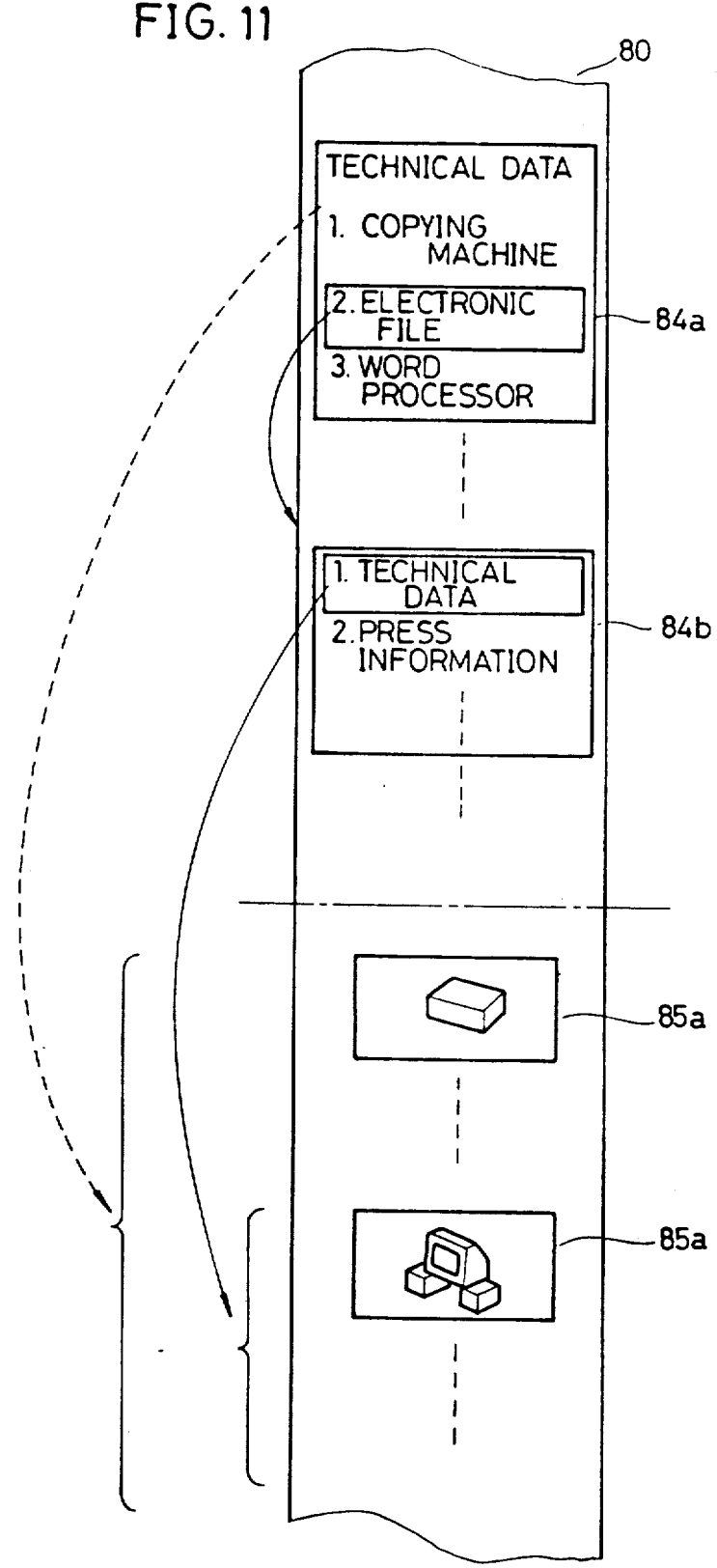
FIG. 11 is a diagram for illustrating information stored in storage as shown in FIG. 10.

FIG. 11 is a diagram for illustrating information stored in storage as shown in FIG. 10. Referring to FIG. 11, primary information storage regions 85a, 85a, ... store picture information read by the scanner 7 as shown in FIG. 10, reduced by the reduction circuit 10 and compressed by the compression/expansion circuit 11 as reduced primary information. Each of secondary information storage regions 84a and 84b stores the head address indicating the cover of each piece of reduced primary information stored in the primary information storage region 85a as an element of retrieval information.

Figure 12:
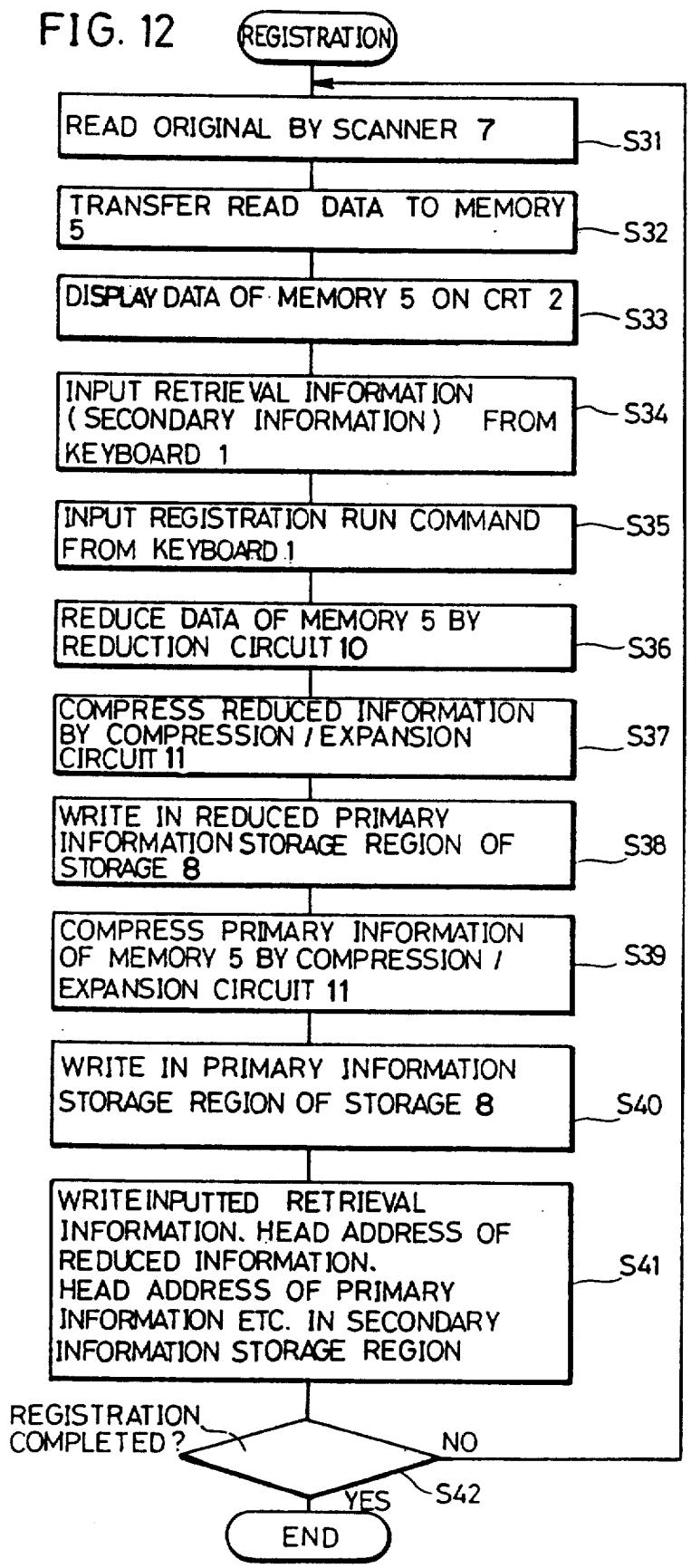
FIG. 12 is a flow chart for illustrating operation for registration in the embodiment as shown in FIG. 10.

FIG. 12 is a flow chart for illustrating registration in the embodiment of the present invention, and FIGS. 13A to 13D are flow charts for illustrating retrieval operation in the embodiment of the present invention.

Referring to FIGS. 10, 11, 12 and 13A to 13D, description is now made on the operation of the third embodiment.

At a step S31, the scanner 7 reads an image on an original in resolution of 12/mm by 12mm.

The read picture information is transferred to memory 5 through an interface circuit 6 at a step S32. At a step S33, the CPU 3 makes a display control circuit 4 display the data transferred to the memory 5 on a CRT display 2. At this time, the CPU 3 provides an instruction to the display control circuit 4, to display information of ½ by ½ serving as primary information, i.e., information in resolution of 6/mm by 6/mm on the CRT display 2.

Then the operator inputs secondary information formed by a title and a keyword corresponding to the primary information from a keyboard 1, and inputs a registration run command from the keyboard 1 at a step S35. Then the CPU 3 reads primary information from the memory 5 at a step S36, to make the reduction circuit 10 reduce the primary information to provide reduced primary information of ¼ by ¼. Thereafter the CPU 3 supplies the reduced primary information to the compression/expansion circuit 11 to compress the same at a step S37. At a step S38, the CPU 3 controls the writing of the reduced primary information, thus compressed into the reduced primary information storage region 85a of the storage 8 through the interface circuit 6.

At a step S39, the CPU 3 again reads primary information from the memory 5, to transfer the primary information to the compression/expansion circuit 11. At a step S40, the CPU 3 writes the compressed primary information in the primary information storage region 85a of the storage 8 through the interface circuit 6. At a step S41, the CPU 3 writes the secondary information inputted from the keyboard 1 in the secondary information storage region 84a of the storage 8 through the interface circuit 6. Thus, the picture information is registered in the storage 8. In order to register a plurality of pieces of reduced primary information and primary information, the aforementioned steps S31 to S42 are repeated. Thus, the mass storage 8 stores a plurality of pieces of primary information, a plurality of pieces of reduced primary information relating to the primary information and a plurality of pieces of secondary information respectively.

Retrieval operation is now described with reference to FIGS. 13A to 13D. At a step S51, the operator inputs a retrieval condition. This condition is set by a keyword to be retrieved such as "ELECTRONIC FILE", for example. The operator further operates the cover search key 101 or the page search key 104. When the cover search key 101 is operated, the CPU 3 determines that the cover search key 101 is operated at a step S52. On the basis of secondary information corresponding to the inputted retrieval condition, the CPU 3 reads information of the corresponding case from the storage 8 at a step S53. Namely, the CPU 3 reads cover information of corresponding reduced primary information on the basis of the head addresses of reduced primary information storage areas stored in the secondary information storage region 84a of the storage 8. Then, at a step S54, the CPU 3 sets m=1 in a register (not shown) provided in the CPU 3.

At a step S55, the CPU 3 displays reduced primary information of an m-th cover on the CRT display 2. Namely, the CPU 3 transfers the corresponding reduced primary information read from the storage 8 to the memory 5. The reduced primary information transferred to the memory 5 is returned to the original data by the compression/expansion circuit 11. The CPU 3 issues a thinned display instruction to the display control circuit 4 to make the display control circuit 4 thin reduced primary information of 12/mm by 12/mm to that of ½ by ½, i.e., to reduce the same to primary information for a page in A4 size, thereby to display the same on the CRT display 2.

The operator recognizes the cover information appearing on the CRT display 2, to judge whether or not the same is desired cover information. If the judgement is of NO, the operator operates the next cover search key 102. The CPU 3 determines that the next cover search key 102 is operated at a step S56, and determines whether or not the content of the register is m=k at a step S57. Since reduced primary information relating to covers is merely read from the storage 8 up to the maximum number k, the CPU 3 waits until the next cover search key 102 is operated, when m=k. If m is not equal to k, the CPU 3 increments m by one at a step S58, to display reduced primary information of an (m+1)-th cover at a step S55.

In order to search reduced primary information of previously displayed covers, the operator operates the forecover search key 103. The CPU 3 determines that the forecover search key 103 is operated at a step S59, to determine whether or not m=1 at a step S60. When m=1, the CPU 3 waits until the next cover search key 102 is operated since it means the first cover. If m is not equal to one, the CPU 3 decrements m by one at a step S61, to display reduced primary information of an (−1)-th cover on the CRT display 2 at the step S55.

The operator operates the next cover search key 102 or the forecover search key 103 to retrieve reduced primary information of the corresponding cover. In order to search picture information of a page next to the corresponding cover after retrieving the reduced primary information thereof, the operator operates the next page search key 105. The CPU 3 determines that the next page search key 104 is operated at a step S62 of FIG. 13B, to determine whether or not the next page is the last page at a step S63. If the same is not the last page, the CPU 3 makes the display control circuit 4 display reduced primary information of the next page on the CRT display 2. The page is updated every time the operator operates the next page search key 105, so that reduced primary information of each page is displayed on the CRT display 2. In order to retrieve a forepage, the operator operates the forepage search key 106. Then the CPU 3 determines that the forepage search key 106 is operated at a step S65, and further determines whether or not the forepage is the first page at a step S66. If the determination is of NO, the CPU 3 displays reduced primary information of the forepage on the CRT display 2 at a step S67.

Reduced primary information of each page is displayed on the CRT display 2 by operating the next page search key 105 or the forepage search key 106 as hereinabove described. The operator confirms that reduced primary information of the corresponding page is displayed, to operate the display key 107. The CPU 3 responsively reads primary information corresponding to the reduced primary information from the primary information storage region 84b of the storage 8 at a step S90, to transfer the same to the memory 5. The primary information transferred to the memory 5 is fed to the compression/expansion circuit 11, to be returned to the original data. The CPU 3 issues a thinned display instruction to the display control circuit 4, which in turn thins primary information of 12/mm by 12/mm to that of ½ by ½, i.e., to primary information for a page of A4 size, and displays the same on the CRT display 2.

Then, prescribed page information is inputted at a step S51 as a retrieval condition and the page search key 104 is operated, whereby the CPU 3 determines that the cover search key 104 is operated. At a step S68 of FIG. 13C, the CPU 3 lists up conformable information from the storage 8 on the basis of secondary information of the prescribed page inputted as the retrieval condition. At a step S69, the CPU 3 displays secondary information of corresponding data. The operator recognizes the display to select corresponding information at a step S70. In response to selection of the corresponding information, the CPU 3 reads corresponding primary information from the storage 8 to display the same on the CRT display 2 at a step S71.

When required information cannot be retrieved from the said page, the operator searches the cover to retrieve object information. When the operator operates the cover search key 101, the CPU 3 determines that the cover search key 101 is operated at a step S72, to display reduced primary information of an m-th cover on the CRT display 2 at a step S73. Upon recognization of the display, the operator operates the next cover search key 102 if he wishes to see the next cover. The CPU 3 determines that the next cover search key 102 is operated at a step S74, to determine whether or not m=k. If m is not equal to k, the CPU 3 increments m by one at a step S76, to display reduced primary information of an (m+1)-th cover at a step S73.

In order to see a forepage, the operator operates the forecover search key 103. The CPU 3 determines that the forecover search key 103 is operated at a step S77, to determine whether or not m=1 at a step S78. If m is not equal to one, the CPU 3 decrements m by one at a step S79, to display (m−1)-th reduced primary information on the CRT display 2 at a step S73.

The operator confirms that the reduced primary information of the cover of the corresponding page is displayed on the CRT display 2 in the aforementioned manner, to operate the display key 107. Upon operation of the display key 107, the CPU 3 determines that the page search key 104 is not operated at a step S80, to read primary information corresponding to the page of the reduced primary information displayed on the CRT display 2 from the primary information storage region 84b of the storage 8 at a step S91, to transfer the same to the memory 5. The data transferred to the memory 5 is fed to the compression/expansion circuit 11 to be returned to the original data and displayed on the CRT display 2.

Figure 13A:
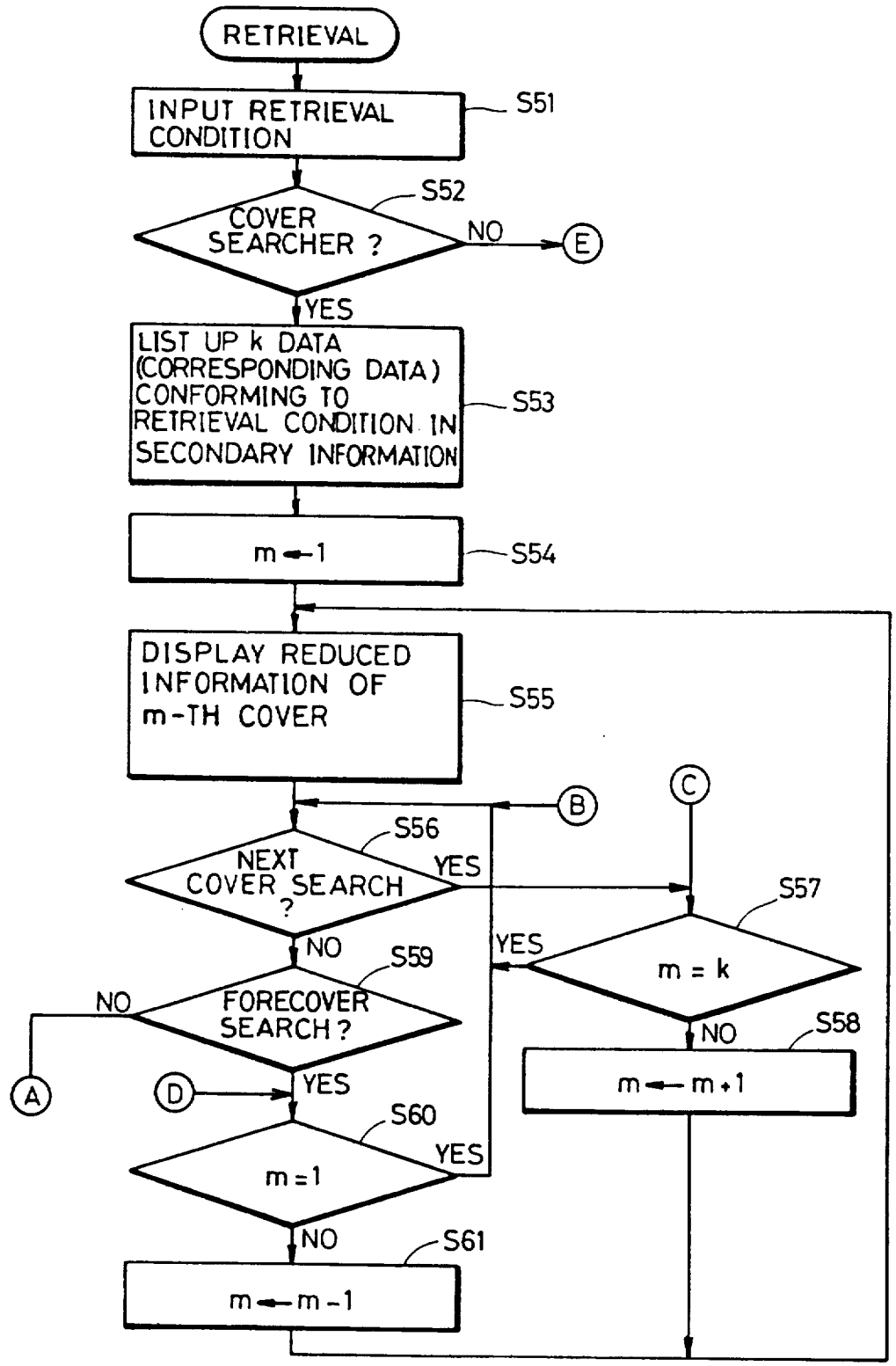
FIGS. 13A, 13B, 13E, and 13D are flow charts for illustrating retrieval operation in the embodiment as shown in FIG. 10.
Figure 13C:
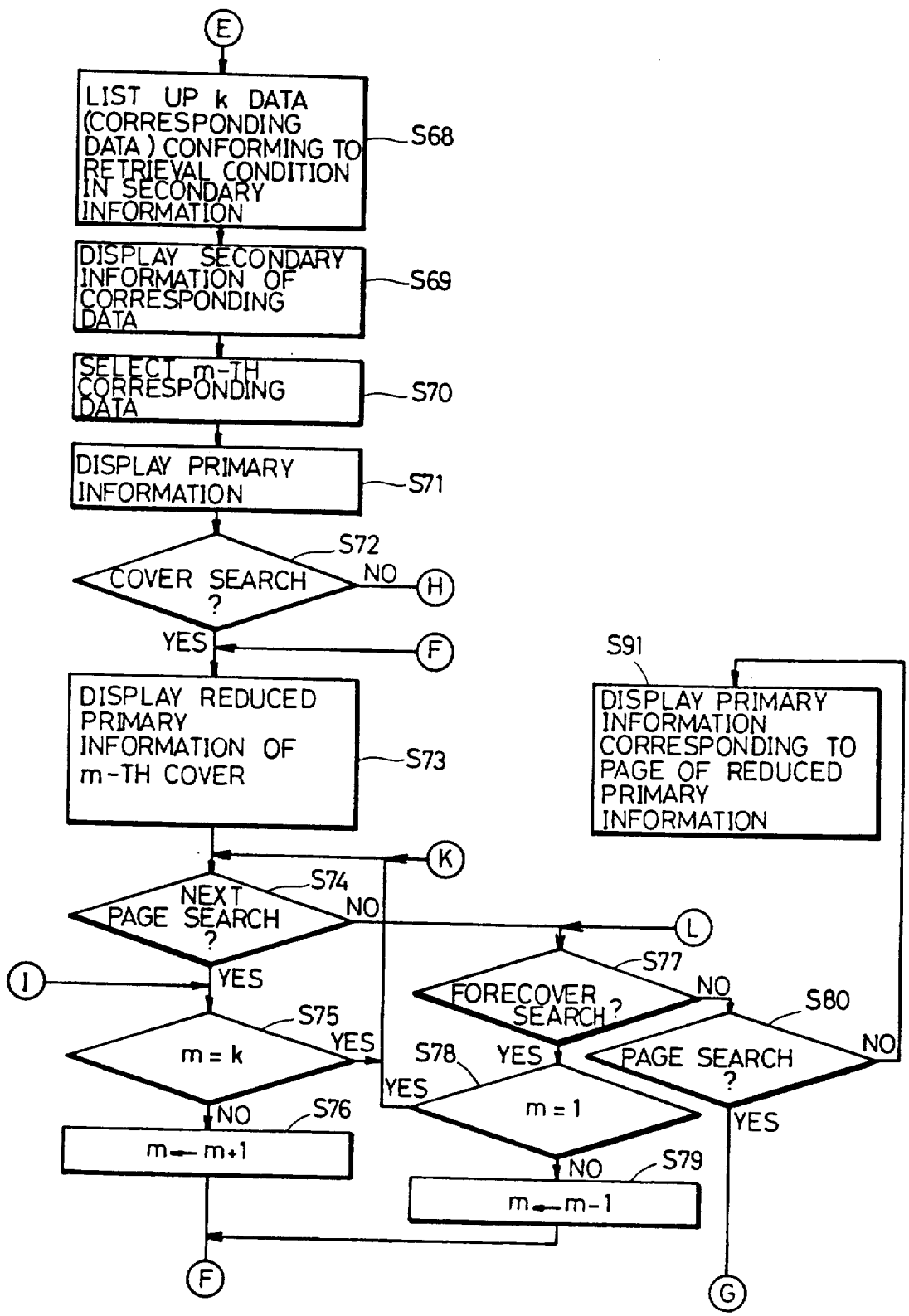
Figure 13D:
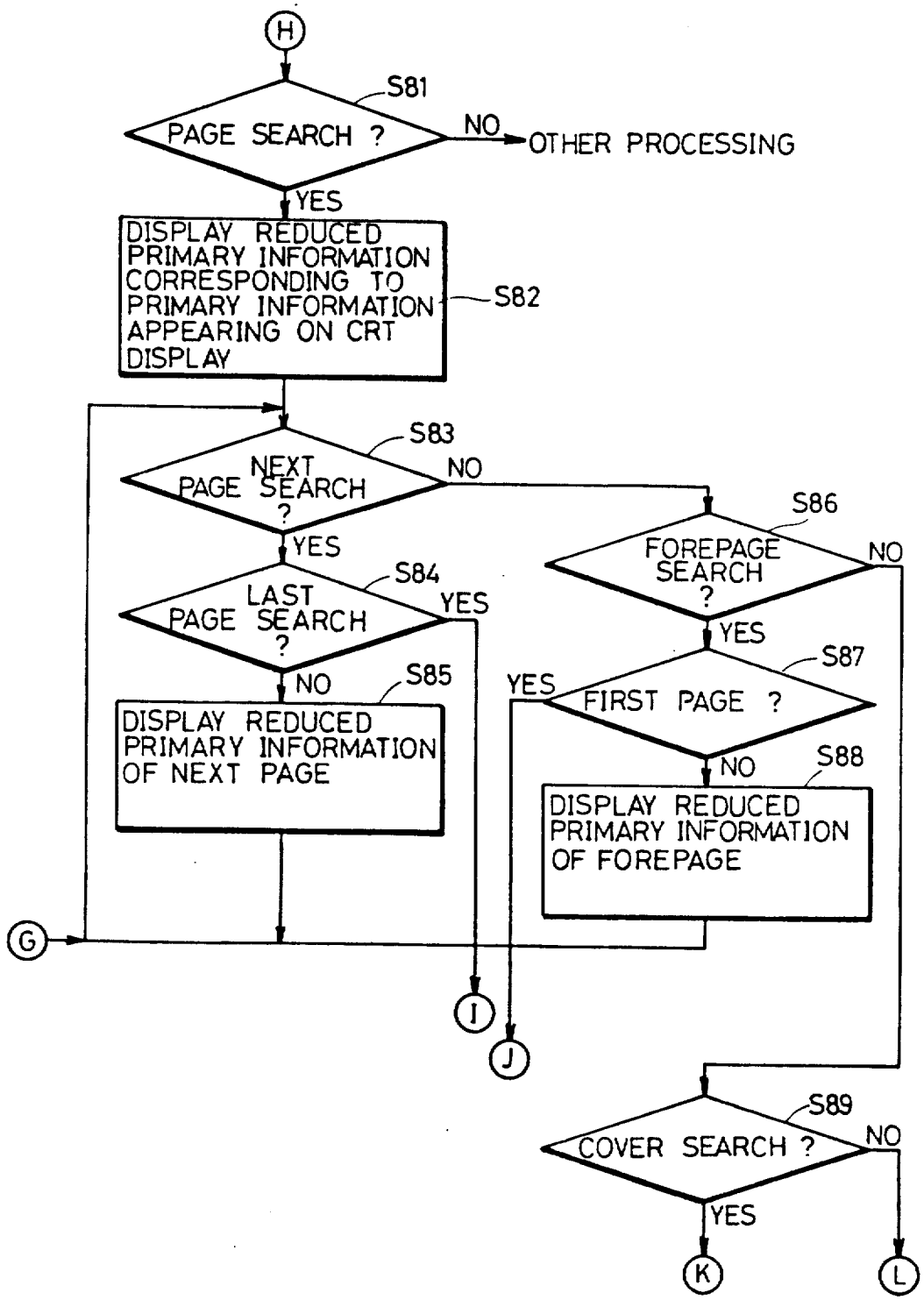

When the operator operates the page search key 104 without operating the display key 107, the CPU 3 determines that the page search key 104 is operated at a step S80, to advance to a step S83 as shown in FIG. 13D. When a determination is made that the next page search key 105 is operated at the step S83, the CPU 3 determines whether or not the operation is for final page search at a step S84. If the determination is of NO, the CPU 3 displays reduced primary information of a next page on the CRT display 2 at a step S85.

If the operator operates the forepage search key 106 at this time, the CPU 3 determines that the forepage search key 106 is operated at a step S86, to determine whether or not the forepage is the first page at a step S87. If the determination is of NO, the CPU 3 displays reduced primary information of the forepage at a step S88.

When the operator operates the cover search key 101, the CPU 3 determines that the cover search key 101 is operated at a step S89, to advance to the step S74 as shown in FIG. 13C. If the display key 107 is operated without operation of the cover search key 101, the CPU 3 advances to the aforementioned step S90, to perform a prescribed display.

When the page search key 104 is operated after the display of the primary information at the step S71 as shown in FIG. 13C, the CPU 3 determines that the page search key 104 is operated at the step S81, to display reduced primary information corresponding to the primary information appearing on the CRT display 2, to thereafter perform the aforementioned operation of the steps S83 to S89.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method, in a hierarchical registration and retrieval system, for registering picture information in a book type format including a plurality of pages for each of a plurality of originals, and for registering retrieval information corresponding to said picture information for each of said plurality of originals in a plurality of primary and secondary menus containing picture retrieval categories and subcategories, respectively, as well as non-categorized picture retrieval information, and for retrieving picture information of a desired page of a desired original selected from a plurality of said registered originals by accessing primary and secondary menus, comprising the steps of:

generating full resolution picture information for each of the plurality of pages;

inputting primary and secondary retrieval information, corresponding to said picture information;

generating reduced resolution picture information for each of the plurality of pages in addition to said generated full resolution picture information for each of a plurality of pages;

storing said full resolution and reduced resolution picture information for each of a plurality of pages, the first of said plurality of pages, of both full and reduced resolution picture information of each of said originals registered, being identified as a cover page;

storing said primary and secondary retrieval information, corresponding to said picture information, in the form of primary and secondary menus, respectively, each entry of said primary menu corresponding to a different picture retrieval category and each entry of said secondary menu corresponding to a picture retrieval subcategory;

introducing a retrieval request;

displaying, in response to receipt of said retrieval request, said primary menu;

selecting retrieval information from said primary menu, corresponding to the picture retrieval category of said desired original;

displaying a secondary menu corresponding to the picture retrieval subcategories of the selected picture retrieval category;

selecting retrieval information from said secondary menu, corresponding to the picture retrieval subcategory of said desired original;

sequentially displaying said reduced resolution picture information of a plurality of cover pages, one for each of a plurality of originals, corresponding to said selected picture retrieval subcategory;

selected one of said sequentially displayed cover pages which corresponds to said desired original;

sequentially displaying reduced resolution picture information of a plurality of pages, of said desired original;

selecting a desired one of said sequentially displayed pages;

displaying said full resolution picture information, of said selected page; and printing said full resolution picture information.

2. A method as claimed in claim 1, further comprising the steps of:

compressing said full resolution information prior to storing;

compressing said reduced resolution picture information prior to storing;

expanding said full resolution compressed picture information prior to displaying; and expanding said reduced resolution picture information prior to displaying.

3. A method in a hierarchical registration and retrieval system as claimed in claim 1, wherein at least some of said retrieval information is not arranged in picture retrieval categories or picture retrieval subcategories, further comprising the steps of:

selecting non-categorized picture retrieval information from said primary menu;

selecting non-categorized picture retrieval information from said secondary menu;

recording the picture retrieval categories and subcategories of said primary and secondary menus previously selected; and sequentially displaying picture information of each of a plurality of originals not contained in said picture retrieval categories or subcategories previously selected when said non-categorical picture retrieval information is selected.

4. A method as claimed in claim 1, further comprising the steps of:

inputting information to redisplay a previously displayed one of said plurality of cover pages subsequent to picture information of a previously desired cover page being displayed;

displaying a previously displayed one of said plurality of cover pages in response to said inputted redisplay cover page information;

inputting information to display a next one of said plurality of cover pages in response to displayed picture information of a non-desired cover page;

displaying a next one of said plurality of cover pages in response to said inputted next cover page display information;

inputting information to redisplay a previously displayed one of said plurality of pages in response to displayed picture information of a non-desired page;

displaying a previously displayed one of said plurality of pages in response to said inputted redisplay page information;

inputting information to display a next one of said plurality of pages in response to displayed picture information of a non-desired page; and displaying a next one of said plurality of pages in response to said inputted next page display information.

5. A hierarchical registration and retrieval system, for registering picture information, in a book type format including a plurality of pages for each of a corresponding to said picture information for each of said plurality of originals in a plurality of primary and secondary menus containing picture retrieval categories and subcategories, respectively, as well as non-categorized picture retrieval information, and for retrieving picture information of a desired page of a desired original selected from a plurality of said registered originals by accessing said primary and secondary menus, the system comprising:

scanning means for generating full resolution picture information for each of the plurality of pages;

input means for inputting primary and secondary retrieval information corresponding to said picture information;

reduction means, operatively connected to said scanning means, for developing reduced resolution picture information for each of the plurality of pages;

storing means including, a first storage region for storing said full resolution generated picture information for each of a plurality of pages, the first of said plurality of pages stored being identified as a cover page, and for storing said reduced resolution generated picture information for each of a plurality of pages, the first of said plurality of pages stored being identified as a cover page, and a second storage region for storing said primary and secondary retrieval information, in the form of primary and secondary menus, respectively, each entry of said primary menu corresponding to a different picture retrieval category and each entry of said secondary menu corresponding to a picture retrieval subcategory;

said input means introducing a retrieval request;

display means for displaying said primary menu in response to the receipt of said retrieval request;

said input means selecting retrieval information from said primary menu, corresponding to the picture retrieval category of said desired original;

said display means displaying a secondary menu corresponding to the picture retrieval subcategories of the selected picture retrieval category;

said input means selecting retrieval information from said secondary menu, corresponding to the picture retrieval category of said desired original;

said display means sequentially displaying said reduced resolution picture information, of a plurality of cover pages, one for each of a plurality of originals, corresponding to said selected picture retrieval subcategory;

said input means selecting one of said sequentially displayed cover pages which corresponds to said desired original;

said display means sequentially displaying reduced resolution picture information of a plurality of pages of said desired original, in response to said selected cover page;

said input means selecting a desired one of said sequentially displayed pages;

said display means displaying said full resolution picture information of said selected page in response to said inputted information; and printing means for printing said full resolution picture information in response to said displayed full resolution picture information.

6. A system as claimed in claim 5, further comprising:

compression/expansion means for compressing said full resolution picture information prior to storing;

said compression/expansion means compressing said reduced resolution picture information prior to storing;

said compression/expansion means for expanding said full resolution compressed picture information prior to displaying; and said compression/expansion means expanding said reduced resolution compressed picture information prior to displaying.

7. A hierarchical registration and retrieval system as claimed in claim 5, wherein at least some of said picture retrieval information is non-categorized not arranged in picture retrieval categories or subcategories in said primary and secondary means, wherein:

said input means selects non-categorized picture retrieval information from said primary menu;

said input means selects non-categorized picture retrieval information from said secondary menu;

said storage means records the picture retrieval categories and subcategories of said primary and secondary menus previously selected; and said display means sequentially displays picture information of each of a plurality of originals not contained in said picture retrieval categories or subcategories previously selected when said non-categorical picture retrieval information is selected.

8. A hierarchical registration and retrieval system as claimed in claim 5, further comprising:
    said input means inputting information to redisplay a previously displayed one of said plurality of cover pages subsequent to picture information of a previously desired cover page being displayed;
    said display means displaying a previously displayed one of said plurality of cover pages in response to said inputted redisplay cover page information;
    said input means inputting information to display a next one of said plurality of cover pages in response to displayed picture information of a non-desired cover page;
    said display means displaying a next one of said plurality of cover pages in response to said inputted next cover page display information;
    said input means inputting information to redisplay previously displayed one of said plurality of pages in response to displayed picture information of a non-desired page;
    said displayed means displaying a previously displayed one of said plurality of pages in response to said inputted redisplay page information;
    said input means inputting information to display a next one of said plurality of pages in response to displayed picture information of a non-desired page; and
    said display means displaying a next one of said plurality of pages in response to said inputted next page display information.

* * * * *